(12) United States Patent
Isoda et al.

(10) Patent No.: US 7,199,380 B2
(45) Date of Patent: Apr. 3, 2007

(54) RADIATION IMAGE STORAGE PANEL

(75) Inventors: Yuji Isoda, Kanagawa (JP); Yuichi Hosoi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 89 days.

(21) Appl. No.: 10/927,033

(22) Filed: Aug. 27, 2004

(65) Prior Publication Data

US 2005/0051736 A1 Mar. 10, 2005

(30) Foreign Application Priority Data

Aug. 27, 2003 (JP) ............................. 2003-303468

(51) Int. Cl.
*G03B 42/08* (2006.01)
(52) U.S. Cl. .................................. 250/484.4
(58) Field of Classification Search ............. 250/484.4
See application file for complete search history.

(56) References Cited

U.S. PATENT DOCUMENTS

| 4,769,549 A * | 9/1988 | Tsuchino et al. ........ 250/484.4 |
| 2003/0047697 A1 | 3/2003 | Iwabuchi et al. |
| 2005/0067586 A1* | 3/2005 | Yanagita et al. ........ 250/484.4 |

FOREIGN PATENT DOCUMENTS

JP 2514322 B2 7/1996

* cited by examiner

*Primary Examiner*—Constantine Hannaher
(74) *Attorney, Agent, or Firm*—Sughrue Mion, PLLC

(57) ABSTRACT

A radiation image storage panel has a phosphor layer formed by a gas phase-accumulation method, in which the phosphor layer is composed of a lower sub-layer of a spherical crystal structure and an upper sub-layer of a columnar crystal structure.

7 Claims, 3 Drawing Sheets

RADIATION IMAGE STORAGE PANEL

FIELD OF THE INVENTION

The present invention relates to a radiation image storage panel employable in a radiation image recording and reproducing method utilizing an energy-storable phosphor.

BACKGROUND OF THE INVENTION

When an energy-storable phosphor (e.g., stimulable phosphor, which gives off stimulated emission) is exposed to radiation such as X-rays, it absorbs and stores a portion of the radiation energy. The phosphor then emits stimulated emission according to the level of the stored energy when exposed to electromagnetic wave such as visible or infrared light (i.e., stimulating light). A radiation image recording and reproducing method utilizing the energy-storable phosphor has been widely employed in practice. In that method, a radiation image storage panel, which is a sheet comprising the energy-storable phosphor, is used. The method comprises the steps of: exposing the storage panel to radiation having passed through an object or having radiated from an object, so that radiation image of the object is temporarily recorded in the storage panel; sequentially scanning the storage panel with a stimulating light such as a laser beam to emit a stimulated light; and photoelectrically detecting the emitted light to obtain electric image signals. The storage panel thus treated is then subjected to a step for erasing radiation energy remaining therein, and then stored for the use in the next recording and reproducing procedure. Thus, the radiation image storage panel can be repeatedly used.

The radiation image storage panel (often referred to as energy-storable phosphor sheet) has a basic structure comprising a support and a phosphor layer provided thereon. However, if the phosphor layer is self-supporting, the support may be omitted. Further, a protective layer is generally provided on the free surface (surface not facing the support) of the phosphor layer to keep the phosphor layer from chemical deterioration or physical damage.

Various kinds of phosphor layers are known and used. For example, a phosphor layer comprising a binder and an energy-storable phosphor dispersed therein is generally used, and a phosphor layer comprising agglomerate of an energy-storable phosphor without binder is also known. The latter layer can be formed by a gas phase-accumulation method or by a firing method. Further, still also known is a phosphor layer comprising energy-storable phosphor agglomerate impregnated with a polymer material.

Japanese Patent Provisional Publication 2001-255610 discloses a variation of the radiation image recording and reproducing method. While an energy-storable phosphor of the storage panel used in the ordinary method plays both roles of radiation-absorbing function and energy-storable function, those two functions are separated in the disclosed method. In the method, a radiation image storage panel comprising an energy-storable phosphor (which stores radiation energy) is used in combination with a phosphor screen comprising another phosphor which absorbs radiation and emits ultraviolet or visible light. The disclosed method comprises the steps of causing the radiation-absorbing phosphor of the screen (and of the panel) to absorb and convert radiation having passed through an object or having radiated from an object into ultraviolet or visible light; causing the energy-storable phosphor of the panel to store the energy of the converted light as radiation image information; sequentially exciting the energy-storable phosphor with a stimulating ray to emit stimulated light; and photoelectrically detecting the emitted light to obtain electric signals giving a visible radiation image.

The radiation image recording and reproducing method (or radiation image forming method) has various advantages as described above. It is still desired that the radiation image storage panel used in the method have as high sensitivity as possible and, at the same time, give a reproduced radiation image of high quality (in regard to sharpness and graininess).

In order to improve the sensitivity and the image quality, it is proposed that the phosphor layer of the radiation image storage panel be prepared by a gas phase-accumulation method such as vacuum vapor deposition, sputtering or chemical vapor deposition (CVD). The process of vacuum vapor deposition, for example, comprises the steps of: heating to vaporize an evaporation source comprising a phosphor or starting materials thereof by means of a resistance heater or an electron beam, and depositing and accumulating the vapor on a substrate such as a metal sheet to form a layer of the phosphor in the form of columnar crystals.

The phosphor layer formed by a gas phase-accumulation method contains no binder and consists of phosphor only, and there are gaps among the columnar crystals of the phosphor. Because of the presence of gaps, the stimulating light can stimulate the phosphor efficiently and the emitted light can be collected efficiently. Accordingly, a radiation image storage panel having that phosphor layer has high sensitivity. At the same time, since the gaps prevent the stimulating light from diffusing parallel to the layer, the radiation image storage panel can give a reproduced radiation image of high sharpness.

Japanese Patent Provisional Publication 2003-050298 discloses a process for preparation of a radiation image storage panel. In the disclosed process, first a layer of phosphor matrix alone in the form of columnar crystals is formed by a gas phase-accumulation method, and then another layer made of the phosphor is formed thereon (so that each columnar crystal of the phosphor may be one-to-one grown on each columnar crystal of the phosphor matrix), to prepare a phosphor layer excellent in columnar crystallinity.

Japanese Patent No. 2,514,322 discloses a radiation image storage panel improved in both of sharpness and sensitivity. The disclosed storage panel comprises a stimulable phosphor layer and a light-scattering layer provided thereon. In the phosphor layer, columnar crystals of stimulable phosphor are aligned. The light-scattering layer has a rough surface, and is placed on the side opposite to the side where stimulating light comes. Disclosed materials for the light-scattering layer are pigments, porous metals, sand-ground metals, ceramics, frosted glass and opal glass.

SUMMARY OF THE INVENTION

It is an object of the present invention to provide a radiation image storage panel improved in sensitivity.

It is another object of the invention to provide a highly sensitive radiation image storage panel in which the phosphor layer strongly adheres to the support.

The applicants have studied the phosphor layer formed by a gas phase-accumulation method, and have finally found that the sensitivity of radiation image storage panel can be remarkably improved if the phosphor layer is not a single layer of columnar phosphor crystals alone but comprises an upper sub-layer of columnar crystal structure and a lower sub-layer of spherical crystal structure. That is because the spherical crystals in the lower sub-layer can reflect light (such as stimulating light and stimulated emission) to increase the amount of emission coming out of the top surface of the upper sub-layer. In addition, it has been also found that the phosphor layer having that constitution strongly adheres to the support.

The present invention resides in a radiation image storage panel having a phosphor layer formed by a gas phase-accumulation method, wherein the phosphor layer comprises a lower sub-layer of a spherical crystal structure and an upper sub-layer of a columnar crystal structure.

The radiation image storage panel of the invention has a phosphor layer composed of at least two sub-layers. The lower sub-layer of a spherical crystal structure, which comprises spherical crystalline particles, not only serves as a light-reflecting layer but also improves columnar crystallinity of the upper sub-layer during the step of evaporation-deposition in the gas phase-accumulation method, to improve the sensitivity of the storage panel. Further, when a support is provided on the bottom of the lower sub-layer, the adhesion between the support and the phosphor layer is improved. Since it is not necessary to form a light-reflecting layer independently, the radiation image storage panel of the invention can be produced by fewer production steps and, accordingly, at smaller cost than a conventional radiation image storage panel.

DETAILED DESCRIPTION OF THE INVENTION

Preferred embodiments of the radiation image storage panel according to the invention are as follows.

(1) The ratio in thickness of the lower sub-layer per the upper one is in the range of 0.01 to 0.5.

(2) The spherical crystalline particles contained in the lower sub-layer have a mean size in the range of 1 to 10 μm.

(3) A support is provided on the side of the lower sub-layer, and the lower sub-layer has a thickness in the range of 10 to 100 μm.

(4) The phosphor is an energy-storable phosphor, and is preferably a stimulable alkali metal halide phosphor represented by the following formula (I).

(5) In the formula (I), $M^I$, X, A and z are Cs, Br, Eu and a number satisfying the condition of $1\times10^{-4} \leq z \leq 0.1$, respectively.

Formula (I):

$$M^I X \cdot aM^{II} X'_2 \cdot bM^{III} X''_3 : zA \qquad (I)$$

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Mg, Cu and Bi; and a, b and z are numbers satisfying the conditions of $0 \leq a < 0.5$, $0 \leq b < 0.5$ and $0 < z < 1.0$, respectively.

In the following description, the radiation image storage panel of the invention is explained in detail with the attached drawings referred to.

Figure 1:
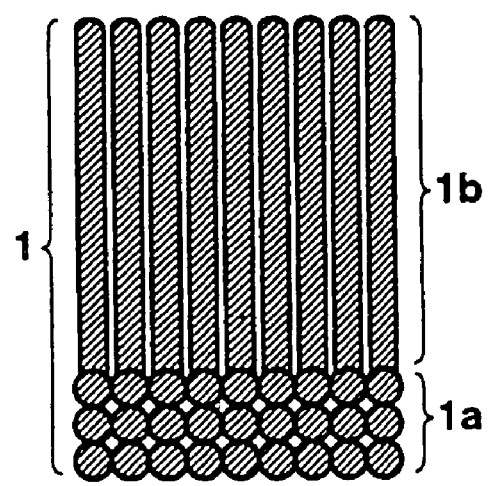
FIG. 1 is a partial sectional view schematically illustrating an example of the constitution of radiation image storage panel according to the invention.

FIG. 1 is a partial sectional view schematically illustrating an example of the constitution of radiation image storage panel according to the invention. The storage panel shown in FIG. 1 comprises a phosphor layer 1 formed by a gas phase-accumulation method, and the phosphor layer 1 consists of a lower layer 1a of a spherical crystal structure and an upper sub-layer 1b of a columnar crystal structure. Radiation image information recorded in the phosphor layer is generally read out from the upper side (i.e., from the top surface of the upper sub-layer 1b).

In the invention, the term "spherical crystalline particles" means crystalline particles in which the ratio of minor diameter/major diameter is more than 0.5. Generally, the dimension (diameter) perpendicular to the direction in which the crystal has been grown by a gas phase-accumulation method (namely, dimension parallel to the layer surface) and the dimension (diameter) parallel to the direction in which the crystal has grown (namely, dimension along the thickness of the phosphor layer) are in a ratio (former/latter) of 0.5 to 2. The spherical crystalline particles generally have a mean size in the range of 1 to 10 μm. The lower sub-layer 1a comprises agglomerates of the spherical crystal particles (each agglomerate consists of two or more particles fused to combine like a string of beads), and the amount of the spherical crystalline particles is 50%. or more. The size of the agglomerate is obtained on the assumption that each agglomerated spherical particle is an ideal sphere.

The upper sub-layer 1b comprises independently grown columnar crystals and gaps among them. The columnar crystals generally have a mean size of 1 to 10 μm. Generally, the phosphor layer 1 consisting of the lower sub-layer 1a and the upper sub-layer 1b is continuously formed by a gas phase-accumulation method such as vacuum vapor deposition. As shown in FIG. 1, in thus formed phosphor layer, columnar crystals are grown on piled-up spherical crystalline particles.

The lower sub-layer 1a of a spherical crystal structure can be formed by, as described later, depositing and accumulating the phosphor in gas phase (vapor of the phosphor) under a medium vacuum (approx. 0.05 to 10 Pa). The shape, size and packing density of the spherical crystals in the lower sub-layer 1a can be controlled by adjusting the evaporation-deposition conditions such as degree of vacuum, temperature of substrate, deposition rate, and contents of additives (e.g., activator). Also for forming the upper sub-layer 1b of columnar crystal structure, the phosphor is vaporized and deposited to accumulate in gas phase under the medium vacuum. Thus formed upper sub-layer 1b is excellent in columnar crystallinity.

If the phosphor comprises a phosphor matrix compound and an activator, only the phosphor matrix compound may be deposited and accumulated in gas phase to form the lower sub-layer 1a of a spherical crystal structure. However, additives such as the activator contained in the upper sub-layer 1b are generally diffused into the lower sub-layer 1a while the substrate is heated and/or during heating treatments performed after the evaporation-deposition, and are consequently distributed in the thickness direction. At the same time, the spherical crystalline particles are fused to combine with each other, and the columnar crystals and the spherical crystalline particles thereunder are also fused to combine with each other.

Figure 2:
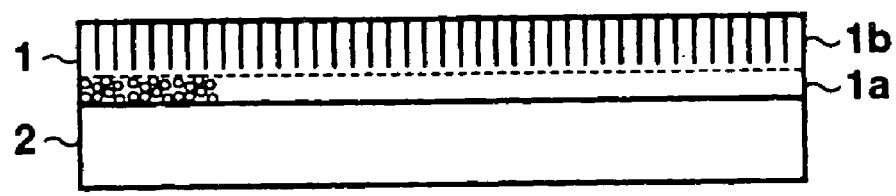
FIG. 2 is a sectional view schematically illustrating another example of the constitution of radiation image storage panel according to the invention.

The ratio in thickness between the lower sub-layer 1a and the upper sub-layer 1b (former/latter) preferably is in the range of 0.01 to 0.5. Particularly in the case where a support (substrate) is provided as shown in FIG. 2, the thickness of the lower sub-layer 1a preferably is in the range of 10 to 100 µm in consideration of the adhesion between the support and the phosphor layer. The thickness of the phosphor layer (that is, the total thickness of the sub-layers 1a and 1b) generally is in the range of 100 µm to 1 mm, preferably in the range of 200 to 700 µm.

Since the lower sub-layer comprises spherical crystal particles and voids among them, it reflects light (particularly, stimulating light) to serve as a light-reflecting layer. Further, the spherical crystals in the lower sub-layer improves columnar crystallinity of the upper sub-layer. Consequently, the presence of the lower sub-layer remarkably increases the amount of emission given off from the top surface of the upper sub-layer, to improve the sensitivity of storage panel.

FIG. 2 is a sectional view schematically illustrating another example of the constitution of radiation image storage panel according to the invention. The radiation image storage panel shown in FIG. 2 comprises a phosphor layer 1 formed by a gas phase-accumulation method and a support (substrate) 2. The phosphor layer 1 consists of a lower layer 1a of a spherical crystal structure and an upper sub-layer 1b a of columnar crystal structure.

The support 2 is generally used as a substrate on which the vapor is deposited and accumulated in the gas-phase accumulation process. The lower layer 1a of a spherical crystal structure enhances the adhesion between the support 2 and the phosphor layer 1. In a conventional storage panel comprising a light-reflecting layer (or light-reflecting substrate) and a phosphor layer formed thereon by a gas-accumulation method, light-reflecting material contained in the light-reflecting layer (or substrate) often migrates into the phosphor layer during the heating treatments. The phosphor layer thus doped with the light-reflecting material gives off a less amount of emission. In contrast, since the radiation image storage panel of the invention not containing the light-reflecting material, it is free from the deterioration of emission caused by the contamination with these impurities.

FIGS. 3 to 6 are representative electron-micrographs of a radiation image storage panel according to the invention.

Figure 3:
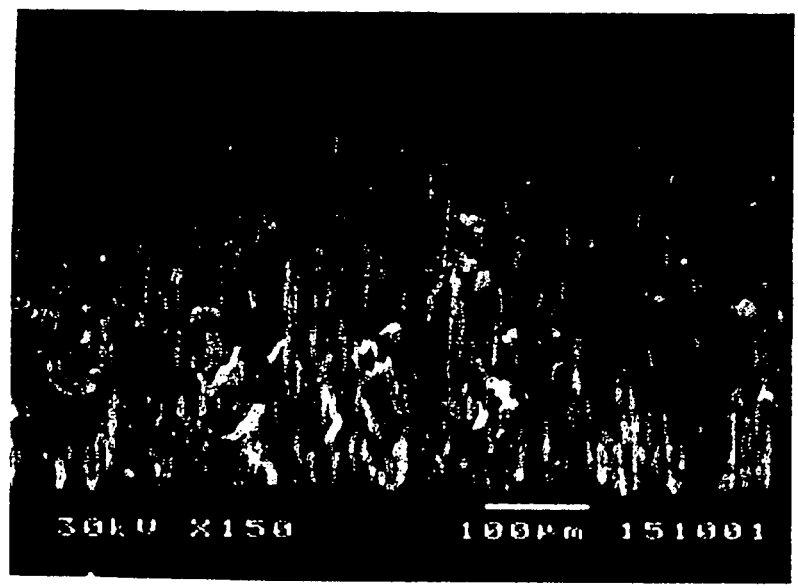
FIG. 3 is a sectional electron-micrograph showing an example of radiation image storage panel according to the invention.

FIG. 3 is a sectional electron-micrograph (×150) of a radiation image storage panel according to the invention. The storage panel of FIG. 3 comprises a support (substrate) and a phosphor layer (consisting of a lower sub-layer of a spherical crystal structure and an upper sub-layer of a columnar crystal structure). The thickness of the phosphor layer, the mean size of the spherical crystal particles and the size of the columnar crystals are 492 µm, approx. 5 µm and approx. 5 µm, respectively.

Figure 4:
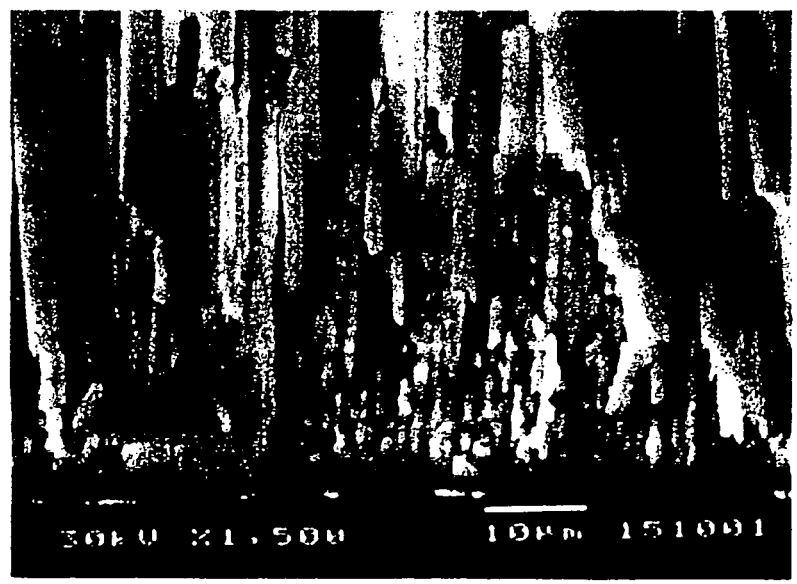
FIG. 4 is an enlarged sectional electron-micrograph showing a lower portion of FIG. 3.

FIG. 4 is an enlarged sectional electron-micrograph (×1,500) of a lower portion of FIG. 3.

Figure 5:
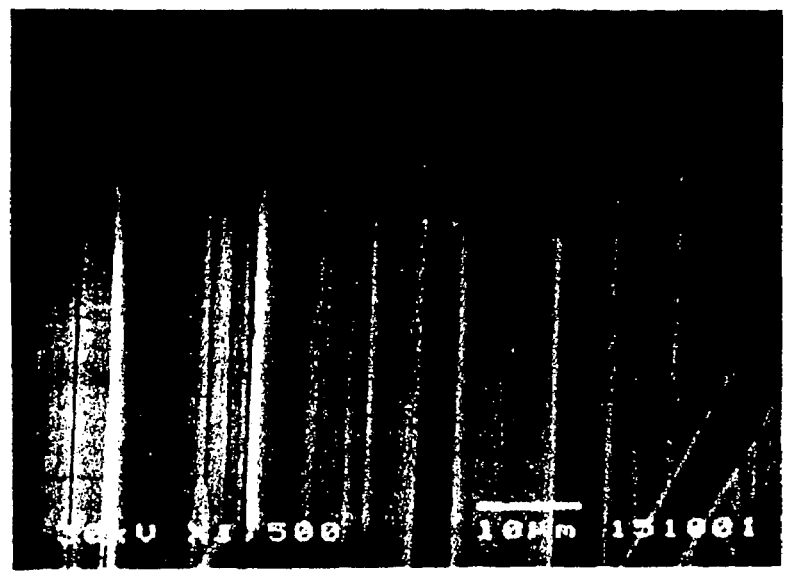
FIG. 5 is another enlarged sectional electron-micrograph showing an upper portion of FIG. 3.

FIG. 5 is another enlarged sectional electron-micrograph (×1,500) of an upper portion of FIG. 3.

Figure 6:
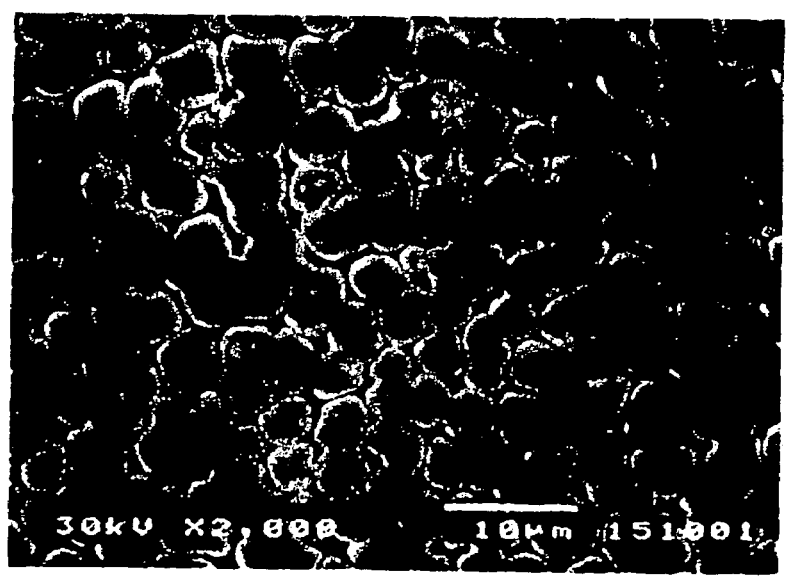
FIG. 6 is still another electron-micrograph showing a surface of the phosphor layer of radiation image storage panel according to the invention.

FIG. 6 is still another electron-micrograph (×2,000) showing a surface of the phosphor layer of radiation image storage panel.

The radiation image storage panel is by no means restricted to the structure of the above-mentioned drawings, and may have, for example, a protective layer and various other auxiliary layers as described later.

In the following description, the process for preparation of the radiation image storage panel of the invention is explained in detail, by way of example, in the case where the phosphor is an energy-storable phosphor and where a vapor deposition process of resistance-heating type is adopted as the gas phase-accumulation method. Since the vapor deposition utilizing resistance-heating can be carried out under a medium vacuum, it is easy to form a vapor-deposited layer excellent in columnar crystallinity.

The substrate on which the vapor is deposited is that generally used as a support of the radiation image storage panel, and hence can be optionally selected from known materials conventionally used as a support of storage panel. The substrate is preferably a sheet of quartz glass, sapphire glass; metal such as aluminum, iron, tin or chromium; or heat-resistant resin such as aramide. Particularly preferred is an aluminum plate. For improving the sensitivity or the image quality (e.g., sharpness and graininess), a conventional radiation image storage panel often has a light-reflecting layer containing a light-reflecting material such as titanium dioxide or a light-absorbing layer containing a light-absorbing material such as carbon black. These auxiliary layers can be placed in the storage panel of the invention, according to the aim and the use. Further, in order to accelerate growth of the columnar crystals, a great number of very small convexes or concaves may be provided on the substrate surface on which the vapor is deposited. If an auxiliary layer such as a subbing layer (e.g., adhesive layer), a light-reflecting layer or a light-absorbing layer is formed on the deposited-side surface of the substrate, the convexes or concaves may be provided on the surface of the auxiliary layer.

The energy-storable phosphor is preferably a stimulable phosphor giving off stimulated emission in the wavelength region of 300 to 500 nm when exposed to a stimulating ray in the wavelength region of 400 to 900 nm.

The phosphor particularly preferably is a stimulable alkali metal halide phosphor represented by the formula (I):

$$M^I X \cdot aM^{II} X'_2 \cdot bM^{III} X''_3 : zA \qquad (I)$$

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Mg, Cu and Bi; and a, b and z are numbers satisfying the conditions of $0 \leq a < 0.5$, $0 \leq b < 0.5$ and $0 < z < 1.0$, respectively.

In the formula (I), z preferably is a number satisfying the condition of $1 \times 10^{-4} \leq z \leq 0.1$; $M^I$ preferably comprises at least Cs; X preferably comprises at least Br; and A is preferably Eu or Bi, more preferably Eu. The phosphor represented by the formula (I) may further comprise metal oxides such as aluminum oxide, silicon dioxide and zirconium oxide as additives in an amount of 0.5 mol or less based on one mol of $M^I X$.

As the phosphor, it is also preferred to use a rare earth activated alkaline earth metal fluoride halide stimulable phosphor represented by the formula (II):

$$M^{II}FX{:}zLN \quad (II)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (II), $M^{II}$ preferably comprises Ba more than half of the total amount of $M^{II}$, and Ln preferably is Eu or Ce. The $M^{II}FX$ in the formula (II) represents a matrix crystal structure of BaFX type, and it by no means indicates stoichiometrical composition of the phosphor. Accordingly, the molar ratio of F:X is not always 1:1. It is generally preferred that the BaFX type crystal have many $F^+(X^-)$ centers corresponding to vacant lattice points of $X^-$ ions since they increase the efficiency of stimulated emission in the wavelength region of 600 to 700 nm. In that case, F is often slightly in excess of X.

Although not described in the formula (II), one or more additives such as bA, $wN^I$, $xN^{II}$ and $yN^{III}$ may be incorporated into the phosphor of the formula (II). A is a metal oxide such as $Al_2O_3$, $SiO_2$ or $ZrO_2$. In order to prevent $M^{II}FX$ particles from sintering, the metal oxide preferably has low reactivity with $M^{II}FX$ and the primary particles of the oxide are preferably super-fine particles of 0.1 μm or less diameter. $N^I$ is a compound of at least one alkali metal selected from the group consisting of Li, Na, K, Rb and Cs; $N^{II}$ is a compound of alkaline earth metal(s) Mg and/or Be; and $N^{III}$ is a compound of at least one trivalent metal selected from the group consisting of Al, Ga, In, Tl, Sc, Y, La, Gd and Lu. The metal compounds preferably are halides, but are not restricted to them.

b, w, x and y represent amounts of the additives incorporated into the starting materials, provided that the amount of $M^{II}FX$ is assumed to be 1 mol. They are numbers satisfying the conditions of $0 \leq b \leq 0.5$, $0 \leq w \leq 2$, $0 \leq x \leq 0.3$ and $0 \leq y \leq 0.3$, respectively. These numbers by no means always represent the contents in the resultant phosphor because some of the additives decrease during the steps of firing and washing performed thereafter. Some additives remain in the resultant phosphor as they are added to the materials, but the others react with $MI^{II}FX$ or are involved in the matrix.

In addition, the phosphor of the formula (II) may further comprise Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetrafluoroborate compounds; hexafluoro compounds such as monovalent or divalent salts of hexa-fluorosilicic acid, hexafluorotitanic acid and hexa-fluorozirconic acid; or compounds of transition metals such as V, Cr, Mn, Fe, Co and Ni. The phosphor employable in the invention is not restricted to the above-mentioned phosphors, and any phosphor that can be essentially regarded as rare earth activated alkaline earth metal fluoride halide stimulable phosphor can be used.

The phosphor in the invention is not restricted to an energy-storable phosphor. It may be a phosphor absorbing radiation such as X-ray and spontaneously giving off (spontaneous) emission in the ultraviolet or visible region. Examples of that phosphor include phosphors of $LnTaO_4$:(Nb, Gd) type, $Ln_2SiO_5$:Ce type and LnOX:Tm type (Ln is a rare earth element); CsX (X is a halogen); $Gd_2O_2S$:Tb; $Gd_2O_2S$:Pr,Ce; $ZnWO_4$; $LuAlO_3$:Ce; $Gd_3Ga_5O_{12}$:Cr,Ce; and $HfO_2$.

In the case where a vapor-deposited phosphor (sub-) layer is formed by multi-vapor deposition (co-deposition), at least two evaporation sources are used. One of the sources contains a matrix material of the energy-storable phosphor, and the other contains an activator material. The multi-vapor deposition is preferred because the vaporization rate of each source can be independently controlled to incorporate the activator homogeneously in the matrix even if the materials have very different melting points or vapor pressures. According to the composition of the desired phosphor, each evaporation source may consist of the matrix material or the activator material only or otherwise may be a mixture thereof with additives. Three or more sources may be used. For example, in addition to the above-mentioned sources, an evaporation source containing additives may be used.

The matrix material of the phosphor may be either the matrix compound itself or a mixture of two or more substances that react with each other to produce the matrix compound. The activator material is generally a compound containing an activating element, and hence is, for example, a halide or oxide of the activating element.

If the activator is Eu, the Eu-containing compound of the activator material preferably contains $Eu^{2+}$ as much as possible because the desired stimulated emission (even if, instant emission) is emitted from the phosphor activated by $Eu^{2+}$. Since contaminated with oxygen, commercially available Eu-containing compounds generally contain both $Eu^{2+}$ and $Eu^{3+}$. The Eu-containing compounds, therefore, are preferably melted under Br gas-atmosphere so that oxygen-free $EuBr_2$ may be prepared to use.

The evaporation source may have a water content of not more than 0.5 wt. %. For preventing the source from bumping, it is particularly important to control the water content in the above low range if the material of matrix or activator is a hygroscopic substance such as EuBr or CsBr. The materials are preferably dried by heating at 100 to 300° C. under reduced pressure. Otherwise, the materials may be heated under dry atmosphere such as nitrogen gas atmosphere to melt at a temperature above the melting point for several minutes to several hours.

The evaporation source, particularly the source containing the matrix material, may contain impurities of alkali metal (alkali metals other than ones constituting the phosphor) in a content of 10 ppm or less and impurities of alkaline earth metal (alkaline earth metals other than ones constituting the phosphor) preferably in a content of 5 ppm or less (by weight). That is particularly preferred if the phosphor is an alkali metal halide stimulable phosphor represented by the formula (I). Such preferred evaporation source can be prepared from materials containing little impurities.

The two or more evaporation sources and the substrate are placed in a vacuum evaporation-deposition apparatus. The apparatus is then evacuated to give a medium vacuum of 0.05 to 10 Pa. For forming a vapor-deposited film of spherical crystal structure (namely, for forming the lower sub-layer), the degree of vacuum is preferably set in the range of 0.1 to 10 Pa. For forming a vapor-deposited film of columnar crystal structure (namely, for forming the upper sub-layer), the degree of vacuum is preferably set in the range of 0.05 to 3 Pa. In addition, it is particularly preferred that, after the apparatus is evacuated to a high vacuum of $1 \times 10^{-5}$ to $1 \times 10^{-2}$ Pa, an inert gas such as Ar, Ne or $N_2$ gas be introduced into the apparatus so that the inner pressure may be the above medium vacuum. In this case, partial pressures of water and oxygen can be reduced. The apparatus can be evacuated by means of an optional combination of, for example, a rotary pump, a turbo molecular pump, a cryo pump, a diffusion pump and a mechanical buster.

For heating the evaporation sources, electric currents are then supplied to resistance heaters. The sources of matrix and activator materials are thus heated, vaporized, and reacted with each other to form the phosphor, which is deposited and accumulated on the substrate. The space between the substrate and each source depends upon various conditions such as the size of substrate, but generally is in the range of 10 to 1,000 mm, preferably in the range of 10 to 200 mm. The distance between the sources generally is in the range of 10 to 1,000 mm. In this step, the substrate may be heated or cooled. The temperature of the substrate generally is in the range of 20 to 350° C., preferably in the range of 100 to 300° C. The deposition rate, which means how fast the formed phosphor is deposited and accumulated on the substrate, can be controlled by adjusting the electric currents supplied to the heaters. The deposition rate generally is in the range of 0.1 to 1,000 μm/min., preferably in the range of 1 to 100 μm/min.

The conditions of evaporation-deposition such as the degree of vacuum, the temperature of substrate and the contents of each evaporation source are first controlled so that a vapor-deposited layer consisting of the phosphor in the form of spherical crystalline particles (i.e., the lower sub-layer) can be formed on the substrate. Otherwise, from only an evaporation source of phosphor matrix, a layer of the phosphor matrix in the form of spherical crystalline particles may be deposited.

Successively after the layer of a spherical crystal structure is formed, the evaporation-deposition is repeated except that the conditions are properly changed so that a layer of the phosphor in the form of columnar structure (i.e., the upper sub-layer) may be formed on the spherical crystal layer.

The heating with resistance heaters may be repeated twice or more to form two or more upper sub-layers.

After the deposition procedure is complete, the deposited layers are preferably subjected to heating treatment (annealing treatment), which is carried out generally at a temperature of 100 to 300° C. for 0.5 to 3 hours, preferably at a temperature of 150 to 250° C. for 0.5 to 2 hours, under inert gas atmosphere which may contain a small amount of oxygen gas or hydrogen gas.

In the case where the phosphor layer is produced by mono-vapor deposition, only one evaporation source containing the above stimulable phosphor or a mixture of starting materials thereof is heated with a single resistance heater. The evaporation source is beforehand prepared so that it may contain the activator in a desired amount. Otherwise, in consideration of the difference of vapor pressure between the matrix components and the activator, the deposition procedure may be carried out while the matrix components are being supplied to the evaporation source.

Thus formed phosphor layer is composed of the lower sub-layer comprising agglomerate of energy-storable phosphor (or matrix compound thereof) in the form of spherical crystalline particles and the upper sub-layer comprising energy-storable phosphor in the form of columnar structure grown almost in the thickness direction. Both sub-layers consist of the phosphor alone without binder, and there are voids among the spherical crystals and there are gaps among the columnar crystals. The additives such as the activator contained in the upper sub-layer are generally diffused into the lower sub-layer while the substrate is heated and/or during heating treatments performed after the deposition, and consequently are distributed along the thickness.

The gas phase-accumulation method usable in the invention is not restricted to the above-described resistance heating process, and various other known processes such as an electron beam-application process, a sputtering process and a CVD process can be used.

It is not necessary for the substrate to be used as a support of the radiation image storage panel. For example, after formed on the substrate, the deposited phosphor film is peeled off from the substrate and then laminated on a support with an adhesive to prepare the phosphor layer. Otherwise, the support (substrate) may be omitted.

It is preferred to provide a protective layer on the surface of the phosphor layer, so as to ensure good handling of the storage panel in transportation and to avoid deterioration. The protective layer is preferably transparent so as not to prevent the stimulating light from coming in or not to prevent the emission from coming out. Further, for protecting the panel from chemical deterioration and physical damage, the protective layer preferably is chemically stable, physically strong, and of high moisture proof.

The protective layer can be provided by coating the phosphor layer with a solution in which an organic polymer such as cellulose derivatives, polymethyl methacrylate or fluororesins soluble in organic solvents is dissolved in a solvent, by placing a beforehand prepared sheet for the protective layer (e.g., a film of organic polymer such as polyethylene terephthalate, a transparent glass plate) on the phosphor layer with an adhesive, or by depositing vapor of inorganic compounds on the phosphor layer. Various additives may be dispersed in the protective layer. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective layer generally is in the range of about 0.1 to 20 μm if the layer is made of polymer material or in the range of about 100 to 1,000 μm if the layer is made of inorganic material such as glass.

For enhancing the resistance to stain, a fluororesin layer may be further provided on the protective layer. The fluororesin layer can be form by coating the surface of the protective layer with a solution in which a fluororesin is dissolved (or dispersed) in an organic solvent, and drying the applied solution. The fluororesin may be used singly, but a mixture of the fluororesin and a film-forming resin is generally employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluororesin layer generally is in the range of 0.5 to 20 μm. For forming the fluororesin layer, additives such as a crosslinking agent, a film-hardening agent and an antiyellowing agent can be used. In particular, the crosslinking agent is advantageously employed to improve durability of the fluororesin layer.

Thus, a radiation image storage panel of the invention can be produced. The storage panel of the invention may be in known various structures. For example, in order to improve the sharpness of the resultant image, at least one of the layers or sub-layers may be colored with a colorant which does not absorb the stimulated emission but the stimulating light.

EXAMPLE 1

(1) Evaporation Source

As the evaporation sources, powdery cesium bromide (CsBr, purity: 4N or more) and powdery europium bromide ($EuBr_2$, purity: 3N or more) were prepared. Each of them was analyzed according to ICP-MS method (Inductively Coupled Plasma Mass Spectrometry), to find impurities. As a result, the CsBr powder contained each of the alkali metals (Li, Na, K, Rb) other than Cs in an amount of 10 ppm or less and other elements such as alkaline earth metals (Mg, Ca, Sr, Ba) in amounts of 2 ppm or less. The $EuBr_2$ powder contained each of the rare earth elements other than Eu in an amount of 20 ppm or less and other elements in amounts of 10 ppm or less. The powders are very hygroscopic, and hence were stored in a desiccator keeping a dry condition whose dew point was −20° C. or below. Immediately before used, they were taken out of the desiccator.

(2) Preparation of Phosphor Layer

A glass substrate as a support was washed successively with an aqueous alkaline solution, purified water and IPA (isopropyl alcohol). The thus-treated substrate was mounted to a substrate holder in an evaporation-deposition apparatus. The CsBr and $EuBr_2$ evaporation sources were individually placed in crucibles equipped with resistance heaters, respectively. The apparatus was then evacuated to make the inner pressure $1 \times 10^{-3}$ Pa by means a combination of a rotary pump, a mechanical booster and a turbo molecular pump, and successively Ar gas was introduced to set the inner pressure at 5 Pa. The substrate was then heated to 220° C. by means of a sheath heater placed on the back side (the opposite side to the face which the vapor is to be deposited on). While a shutter placed between the substrate and each source is closed, each evaporation source was heated by means of the resistance heater. The shutter covering the CsBr source was first opened so that CsBr was alone accumulated on the substrate at a rate of 10 μm/min., to form a layer of CsBr matrix compound. Thus, a lower sub-layer (thickness: 5 μm) was formed. After the apparatus was evacuated to make the inner pressure 1 Pa, the shutter covering the $EuBr_2$ source was then opened so that stimulable CsBr:Eu phosphor was accumulated on the lower sub-layer at the rate of 10 μm/min., to form an upper sub-layer (thickness: 200 μm). During the deposition, the electric currents supplied to the heaters were controlled so that the molar ratio of Eu/Cs in the stimulable phosphor might be $2 \times 10^{-3}/1$. After the evaporation-deposition was complete, the inner pressure was returned to atmospheric pressure and then the substrate was taken out of the apparatus.

Thus treated substrate was placed in a quartz boat, and then inserted into the core of a tube furnace. For removing water adsorbed on the formed sub-layers, the furnace was evacuated to make the inner pressure about 10 Pa by means a rotary pump. With this inner pressure kept, the deposited sub-layers were subjected to heating treatment at 200° C. for one hour under $N_2$ atmosphere. After cooled in $N_2$ atmosphere, the substrate was taken out of the furnace. On the substrate, a phosphor layer (thickness: 205 μm, area: 10 cm×10 cm) was formed. The phosphor layer consisted of the lower sub-layer comprising agglomerate of the phosphor matrix compound in the form of spherical crystals (mean size: 7 μm) and the upper sub-layer comprising the phosphor in the form of columnar crystalline structure grown almost perpendicularly and aligned densely. [see, FIGS. 3 to 6]

Thus, a radiation image storage panel of the invention comprising the support and the phosphor layer was produced by multi-vapor deposition.

EXAMPLES 2 TO 4

The procedure of Example 1 was repeated except that the time of evaporation-deposition in forming the phosphor layer [step (2)] was changed so that the lower sub-layer might have each thickness shown in Table 1, to produce various radiation image storage panels according to the invention.

EXAMPLES 5 TO 7

The procedure of Example 1 was repeated except that, in forming the phosphor layer [step (2)], the time of evaporation-deposition was changed so that the lower sub-layer might have the thickness of 20 μm, and the temperature of the substrate was changed so that the spherical crystal particles might have each mean size shown in Table 1, to produce various radiation image storage panels according to the invention.

COMPARISON EXAMPLE 1

The procedure of Example 1 was repeated except for not providing the lower sub-layer in forming the phosphor layer [step (2)], to produce a conventional radiation image storage panel.

COMPARISON EXAMPLE 2

The procedure of Example 1 was repeated except that the time of evaporation-deposition in forming the phosphor layer [step (2)] was changed so that the thickness of the lower sub-layer might be 120 μm, to produce a radiation image storage panel for comparison.

EXAMPLES 8 TO 10

The procedure of Example 1 was repeated except that, in forming the phosphor layer [step (2)], both of the shutters covering the CsBr and $EuBr_2$ evaporation sources were opened so that CsBr:Eu stimulable phosphor (molar ratio of Eu/Cs: $2 \times 10^{-3}/1$) might be accumulated at the rate of 10 μm/minute to form a lower sub-layer having each thickness shown in Table 1, to produce various radiation image storage panels according to the invention.

COMPARISON EXAMPLE 3

The procedure of Example 1 was repeated except that, in forming the phosphor layer [step (2)], both of the shutters covering the CsBr and $EuBr_2$ evaporation sources were opened so that CsBr:Eu stimulable phosphor might be accumulated at the rate of 10 μm/minute to form a lower sub-layer of 120 μm thickness, to produce a radiation image storage panel for comparison.

EXAMPLES 11 TO 13

The procedure of Example 1 was repeated except that, in forming the phosphor layer [step (2)], an aluminum substrate was used in place of the glass substrate and the time of evaporation-deposition was changed so that the lower sub-layer might have each thickness shown in Table 1, to produce various radiation image storage panels according to the invention.

COMPARISON EXAMPLE 4

The procedure of Example 1 was repeated except that, in forming the phosphor layer [(step (2)], an aluminum substrate was used in place of the glass substrate and the lower sub-layer was not formed, to produce a conventional radiation image storage panel.

Evaluation of Radiation Image Storage Panel

The sensitivity and the adhesion of each produced storage panel were evaluated in the following manners.

(1) Sensitivity

Each radiation image storage panel was encased in a room light-shielding cassette and then exposed to X-rays (voltage: 80 kVp, current: 16 mA). The storage panel was then taken out of the cassette and excited with a He—Ne laser beam (wavelength: 633 nm), and sequentially the emitted stimulated emission was detected by a photomultiplier. On the basis of the detected stimulated emission intensity (converted into a relative value based on the intensity of Comparison Example 1), the sensitivity was evaluated.

(2) Adhesion

The adhesion of each produced storage panel was evaluated in accordance with the Scotch tape method described in "Formation and evaluation of thin film, and Handbook of its application (in Japanese", ed. S. Gonda, Fuji-techno system, 1984, pp. 22.

An adhesive tape (Cellotape, Nichiban Co., Ltd.) was laminated on the surface of the phosphor layer, and then peeled off to make the phosphor layer come off from the support. How much the phosphor layer came off was observed, and thereby the adhesion was evaluated to classify each storage panel into the following grades:

AA: excellent,
A: good,
B: slightly poor, and
C: too poor to use practically.

The results are set forth in Tables 1 and 2.

TABLE 1

| Ex. | Material | Lower sub-layer | | | | |
|---|---|---|---|---|---|---|
| | | Degree of vacuum (Pa) | Temp. of substrate (° C.) | Deposition rate (μm/min.) | Mean size (μm) | Thickness (μm) |
| Ex. 1 | CsBr | 3 | 220 | 10 | 7 | 5 |
| Ex. 2 | CsBr | 3 | 220 | 10 | 7 | 10 |
| Ex. 3 | CsBr | 3 | 220 | 10 | 7 | 20 |
| Ex. 4 | CsBr | 3 | 220 | 10 | 7 | 80 |
| Ex. 5 | CsBr | 3 | 30 | 10 | 1 | 20 |
| Ex. 6 | CsBr | 3 | 100 | 10 | 3 | 20 |
| Ex. 7 | CsBr | 3 | 300 | 10 | 10 | 20 |
| Com. 1 | — | — | — | — | — | 0 |
| Com. 2 | CsBr | 3 | 220 | 10 | 7 | 120 |
| Ex. 8 | CsBr:Eu | 2 | 220 | 10 | 7 | 10 |
| Ex. 9 | CsBr:Eu | 2 | 220 | 10 | 7 | 30 |
| Ex. 10 | CsBr:Eu | 2 | 220 | 10 | 7 | 80 |
| Com. 3 | CsBr:Eu | 2 | 220 | 10 | 7 | 120 |
| Ex. 11 | CsBr | 3 | 220 | 10 | 7 | 5 |
| Ex. 12 | CsBr | 3 | 220 | 10 | 7 | 10 |
| Ex. 13 | CsBr | 3 | 220 | 10 | 7 | 20 |
| Com. 4 | — | — | — | — | — | 0 |

TABLE 2

| Ex. | Upper sub-layer | | | | Evaluation | |
|---|---|---|---|---|---|---|
| | Degree of vacuum (Pa) | Temp. of substrate (° C.) | Deposition rate (μm/min.) | Thickness (μm) | Sensitivity | Adhesion |
| Ex. 1 | 1 | 220 | 10 | 200 | 115 | A |
| Ex. 2 | 1 | 220 | 10 | 200 | 123 | AA |
| Ex. 3 | 1 | 220 | 10 | 200 | 128 | AA |
| Ex. 4 | 1 | 220 | 10 | 200 | 132 | AA |
| Ex. 5 | 1 | 220 | 10 | 200 | 139 | AA |
| Ex. 6 | 1 | 220 | 10 | 200 | 135 | AA |
| Ex. 7 | 1 | 220 | 10 | 200 | 101 | A |
| Com. 1 | 1 | 220 | 10 | 200 | 100 | C |
| Com. 2 | 1 | 220 | 10 | 200 | 132 | B |
| Ex. 8 | 1 | 220 | 10 | 200 | 127 | AA |
| Ex. 9 | 1 | 220 | 10 | 200 | 132 | AA |
| Ex. 10 | 1 | 220 | 10 | 200 | 135 | AA |
| Com. 3 | 1 | 220 | 10 | 200 | 135 | B |
| Ex. 11 | 1 | 220 | 10 | 200 | 175 | A |
| Ex. 12 | 1 | 220 | 10 | 200 | 181 | A |
| Ex. 13 | 1 | 220 | 10 | 200 | 185 | AA |
| Com. 4 | 1 | 220 | 10 | 200 | 100 | C |

The results shown in Tables 1 and 2 clearly indicate that each radiation image storage panel of the invention (Examples 1 to 4, 8 to 10), in which the phosphor layer consisted of a lower sub-layer of spherical crystal structure and an upper sub-layer of columnar crystal structure, had better sensitivity than a storage panel for comparison (Comparison Example 1), whose phosphor layer was a single layer comprising only the columnar crystals of the phosphor. It is understood that the spherical crystalline particles contained in the lower sub-layer preferably have have a mean size in the range of 1 to 10 μm (Examples 5 to 7). The radiation image storage panels of Comparison Examples 2 and 3, whose sub-layers had thicknesses of more than 100 μm, were improved in the sensitivity, but were poor in the adhesion between the support and the phosphor layer. The results of Examples 11 to 13 also made it clear that each storage panel of the invention comprising an aluminum substrate in place of a glass substrate had much improved sensitivity as compared with the conventional storage panel (Comparison Example 4).

What is claimed is:

1. A radiation image storage panel having a phosphor layer formed by a gas phase-accumulation method, wherein the phosphor layer comprises a lower sub-layer of a spherical crystal structure, the lower sub-layer comprising two or more spherical crystalline particles fused to form a string of beads extending vertically to the phosphor layer; and an upper sub-layer of a columnar crystal structure.

2. The radiation image storage panel of claim 1, wherein a ratio in thickness of the lower sub-layer per the upper sub-layer is in the range of 0.01 to 0.5.

3. The radiation image storage panel of claim 1, wherein the spherical crystalline particles have a mean size in the range of 1 to 10 μm.

4. The radiation image storage panel of claim 1, wherein a support is provided to the phosphor layer on the side of the lower sub-layer and the lower sub-layer has a thickness in the range of 10 to 100 μm.

5. The radiation image storage panel of claim 1, wherein the phosphor is an energy-storable phosphor.

6. The radiation image storage panel of claim 5, wherein the energy-storable phosphor is a stimulable alkali metal halide phosphor represented by the formula (I):

$$M^{I}X \cdot aM^{II}X'_{2} \cdot bM^{III}X''_{3}{:}zA \qquad (I)$$

in which $M^{I}$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Mg, Cu and Bi; and a, b and z are numbers satisfying the conditions of $0 \leq a < 0.5$, $0 \leq b < 0.5$ and $0 < z < 1.0$, respectively.

7. The radiation image storage panel of claim 6, wherein $M^{I}$ is Cs, X is Br, A is Eu, and z is a number satisfying the condition of $1 \times 10^{-4} \leq z \leq 0.1$.

* * * * *